Aug. 18, 1953  C. H. NORDELL  2,649,251
WINDING MACHINE
Filed Feb. 26, 1947  3 Sheets-Sheet 1
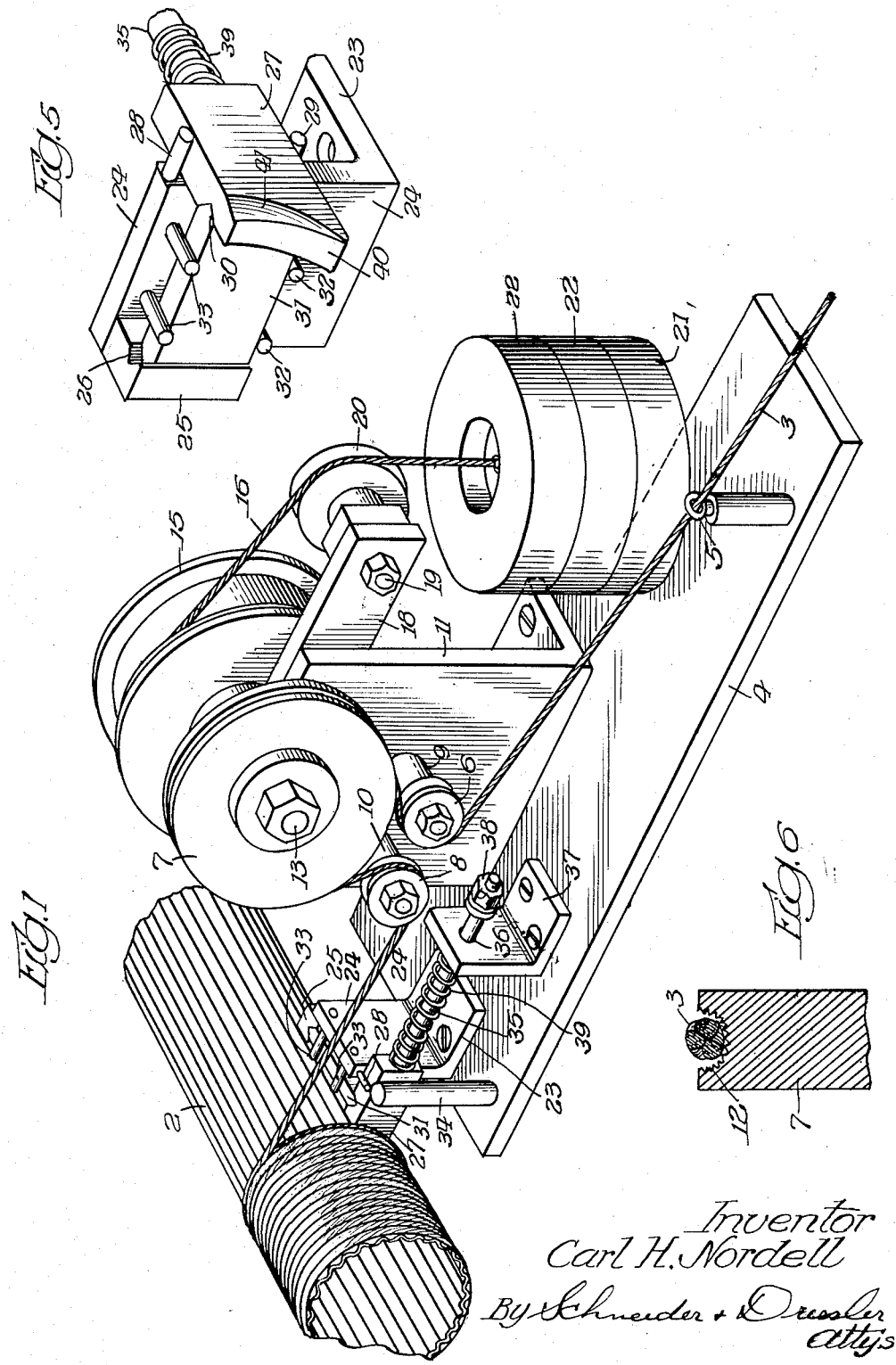
Inventor
Carl H. Nordell
By Schneider & Dressler
Attys

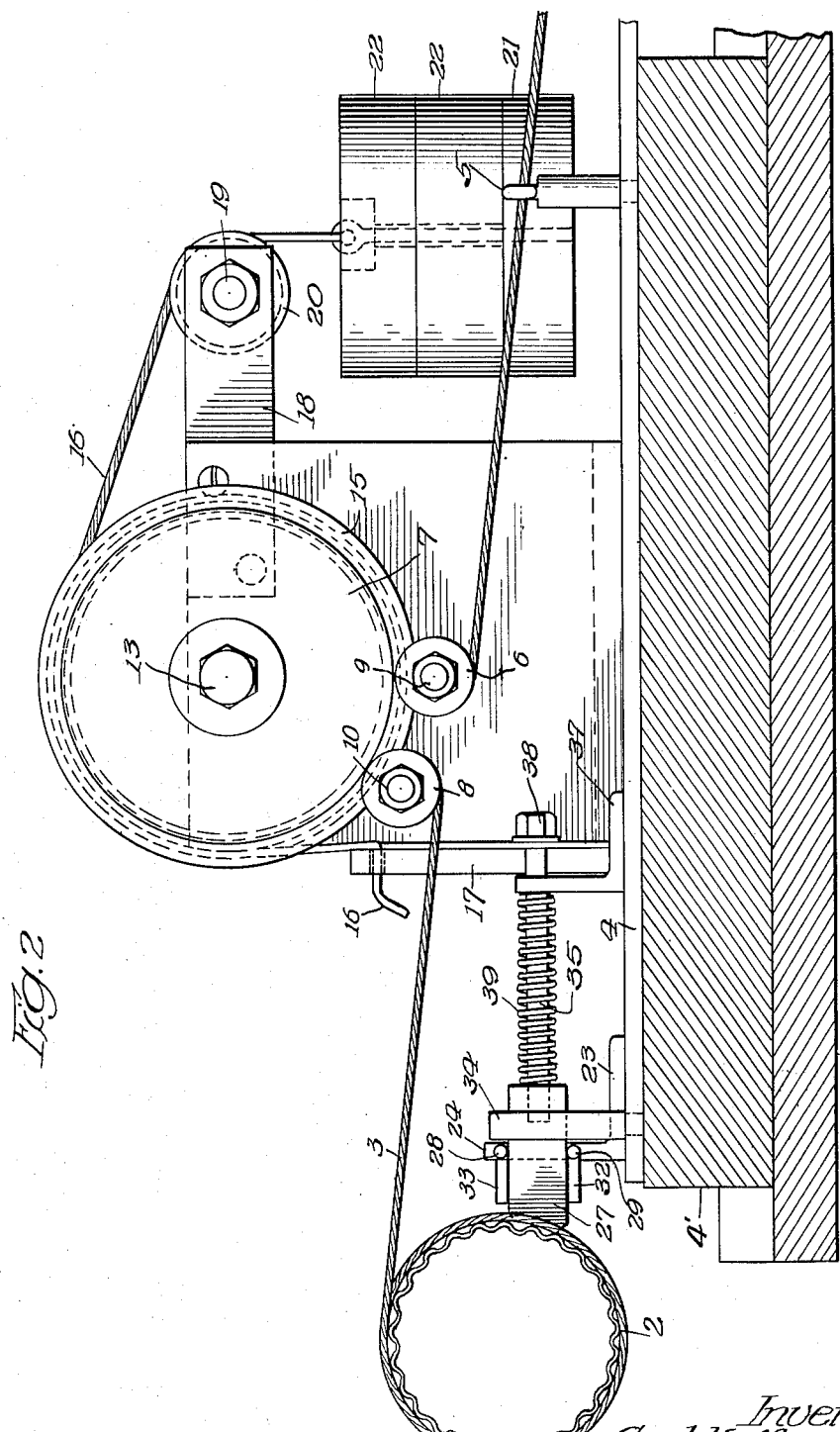

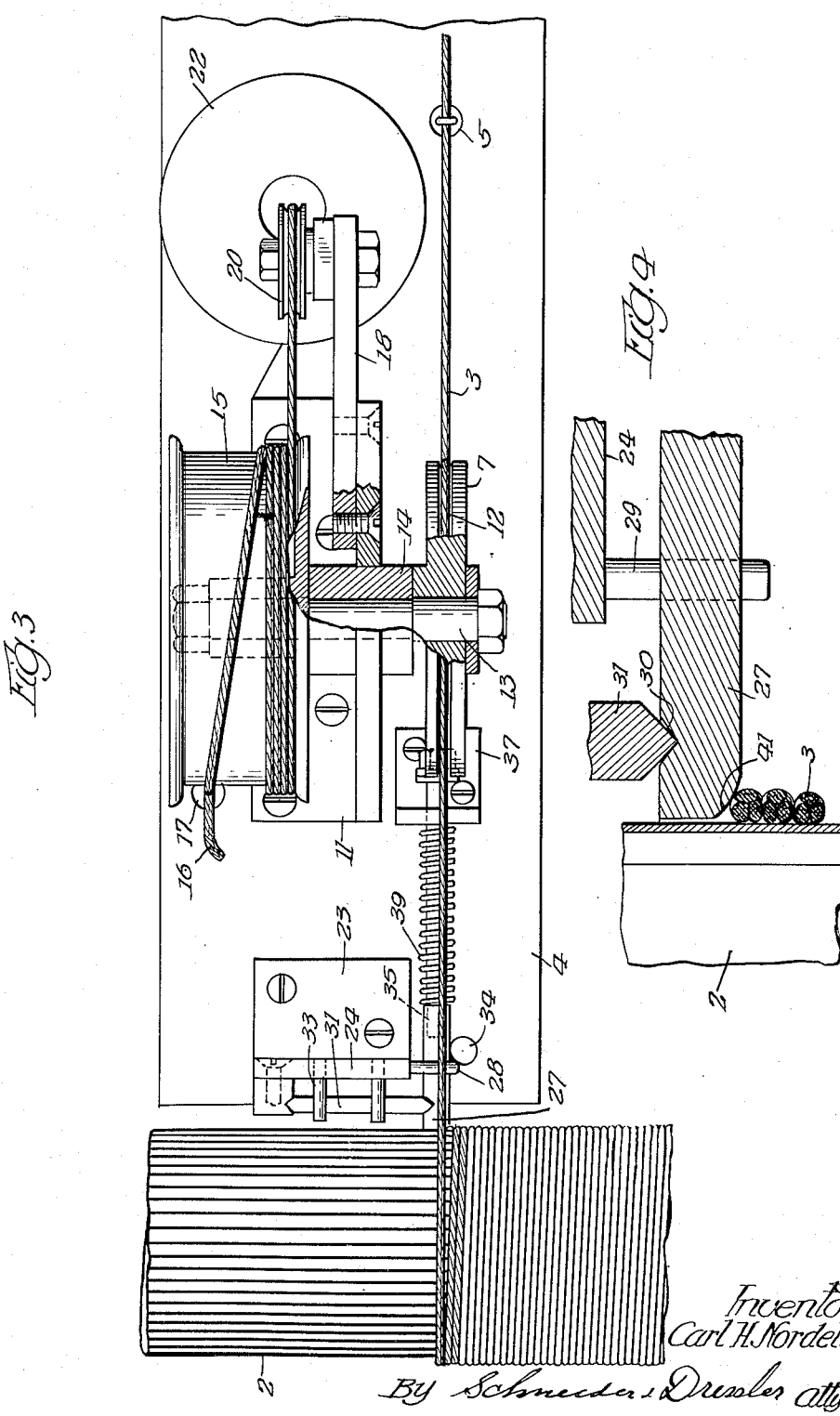

Patented Aug. 18, 1953

2,649,251

UNITED STATES PATENT OFFICE 2,649,251

WINDING MACHINE

Carl H. Nordell, Palm Springs, Calif.

Application February 26, 1947, Serial No. 730,932

3 Claims. (Cl. 242—7)

This invention relates to a winding machine, and particularly to such a machine which is provided with means for tensioning a cord and for compressing it transversely as it is being wound around a tube or cylinder.

The winding machine of the present invention is capable of general application, but is designed particularly to wind a single layer of cord around a tubular or cylindrical core to form a diffuser tube in accordance with the invention described in my copending application, Serial No. 730,931, filed February 26, 1947, now Patent No. 2,555,201, granted May 29, 1951.

The apparatus of my invention comprises simple and efficient means for holding the cord under tension and means for crowding or compressing each turn of cord transversely against the preceding turns as it is being wound on a cylinder or tube. Tension on the cord being wound is controlled by means of a friction wheel around which the cord is pulled and a brake drum, mounted on the same shaft as the friction wheel, around which a few turns of cable are wrapped. Weights or a tension spring applied to one end of the cable exert the required frictional force on the brake drum. Manual means are provided for adjusting the tension on the cord being wound. After the tension has been initially adjusted, it is kept uniform by the weights or tension spring which are adjusted automatically by any variation in the friction factor between the brake drum and the cable.

The core being wound is preferably in a roughened state to assist in preventing the cord which has already been wound thereon in laterally compressed relationship from sliding back to noncompressed position. The means for crowding or compressing successive convolutions of cord on the core, conveniently called a "crowder shoe," is provided with resilient means for permitting the crowder shoe to move away from the cord being wound in response to surface irregularities in the core.

The structures by which the various results are attained will be described in connection with the accompanying drawings, in which:

Figure 1 is a perspective view of a winding machine embodying the invention, including a portion of a core, in this instance a tube, on which the cord is being wound;

Fig. 2 is a side elevation of the machine shown in Fig. 1;

Fig. 3 is a top elevation of the machine with a portion thereof in section to show same details;

Fig. 4 is a fragmentary sectional view, showing the crowder shoe in the act of compressing the cord being wound on the tube;

Fig. 5 is a detail perspective view of the crowder shoe and associated structure; and Fig. 6 is a fragmentary cross sectional view showing the periphery of the friction wheel.

In the drawings, the reference numeral 2 indicates a spindle mounted to rotate at controlled speeds. The spindle may be any cylindrical member, and as shown it is a hollow, longitudinally corrugated metal tube, provided with perforations (not shown), around which a cord 3 is wound to make a diffuser tube, as described in the aforesaid application. One end of the cord is secured to the tube to be wound and the cord is then pulled around the tube from a reel (not shown) by the rotation of the tube. The cord passes around suitable tensioning means so that the feeding movement of the cord may be uniform.

A base 4 is mounted upon a bed or platform 4' (Fig. 2) which is movable transversely of tube 2 as the tube is rotated. The lateral movement of base 4 is regulated so that it is normally at a slower rate of speed than the rate at which the width of the wound portion of the tube would increase if the successive convolutions of the cord were merely laid side by side. In other words, every time the tube makes a complete revolution, thereby adding one convolution of cord to the wound portion of the spindle, the bed, and its associated structure, hereinafter described, move laterally a distance somewhat less than the normal diameter of the cord.

The cord passes from the reel through an eye 5 mounted on base 4 and then around a grooved idler roll 6, a friction wheel 7, and another idler roll 8, and then to the tube. The idler rolls are positioned close to each other adjacent the periphery of the friction wheel so that the cord has to travel around substantially the entire periphery of wheel 7 in passing from idler roll 6 to idler roll 8. Idler rolls 6 and 8 are mounted respectively on shafts 9 and 10 which are supported by an L-shaped bracket 11 secured to base 4.

The periphery of the friction wheel is grooved longitudinally and the surface of the groove is knurled, or otherwise roughened, as indicated at 12, Figure 6. The periphery of wheel 7 may be made of rubber or similar material that will provide frictional contact without damaging the cord.

Wheel 7 is mounted on one end of a shaft 13 which extends through a bearing 14 supported by bracket 11. A brake drum 15 is mounted on the other end of shaft 13. The brake drum may be made of brass or cast iron, and preferably is made as thin as practicable so that the heat of the braking action can be readily dissipated.

The braking action is accomplished by a few turns of cable 16 around the drum. One end of the cable is secured to a post 17 mounted on base 4. An arm 18, supported by bracket 11, extends beyond the edge of the bracket and has a shaft 19 mounted therein. Shaft 19 is parallel to shaft 13 and rotatably supports a grooved wheel 20 aligned with brake drum 15. The other end of cable 16 extends around a portion of wheel 20 and is secured to a weight 21 which puts the cable under tension around the brake drum so that the brake drum acts as a drag on friction wheel 7. The tension on cable 16 can be adjusted by adding removable weights 22 to weight 21 until the desired amount of drag is attained.

If the friction factor between cable 16 and drum 15 increases for any reason, the weight rises slightly and automatically causes a slack in the cable until the weight is brought to rest. Conversely, if the friction factor is reduced the weight sinks slightly and tightens the coils, thus increasing their holding power until the weight is brought to rest. It is desirable to have some slack between drum 15 and post 17 and the cable is secured loosely to the post so that adjustments to provide the desired slack at this end of the cable may be easily made.

The brake structure may be modified, if desired, by substituting a tension spring for the weights 21 and 22.

After cord 3 travels around friction wheel 7 and idler roll 8 it is led to tube 2. As hereinbefore stated, the lateral movement of base 4 and its associated structure is less per revolution of the spindle than the normal diameter of the cord being wound. In order to prevent the cord from piling up on the tube each portion of the cord is compressed laterally against the previously wound convolutions on the tube. The mechanism for compressing the cord is shown in detail in Fig. 5.

An L-shaped bracket 23 is secured to base 4 with its upright member 24 spaced a short distance from tube 2. A block 25 rigidly secured to one edge of upright 24 has a V-shaped groove 26 facing the opposite edge. A crowder shoe 27, mounted between two vertically spaced pins 28 and 29 projecting laterally from the said opposite edge of upright 24, has a similar V-shaped groove 30 facing groove 26. A spreader bar 31 supported on a plurality of pins 32 projecting forwardly from the front of upright 24 has its lateral edges shaped to fit in grooves 26 and 30, and this bar serves to prevent the crowder shoe from moving toward the block 25. A plurality of pins 33, similar to pins 32, are positioned above pins 32 to hold the spreader bar against upward movement.

The crowder shoe structure is assembled on base 4 by securing bracket 23 to the base. Block 25 and pins 28, 29, 32 and 33 have previously been secured to upright 24. Spreader bar 31 is then moved laterally between pins 32 and 33 until one edge is fitted into groove 26. Then crowder shoe 27 is moved laterally until groove 30 engages the other edge of spreader bar 31. At this stage of the assembly a post 34 (Fig. 1) is screwed into base 4 in such a position as to engage the outer edge of crowder shoe 27 and thereby prevent it from moving away from upright 24.

A rod 35 (Fig. 1) projecting rearwardly from crowder shoe 27 passes through an aperture 36 in another L-shaped bracket 37 secured to base 4. A nut 38 limits the forward movement of the rod and crowder shoe. A spring 39 coiled around rod 35 urges the crowder shoe forwardly so that if it is forced rearwardly by any irregularity in the surface of the tube the spring will move it back to proper position as soon as the irregularity is passed. Although only one crowder shoe is shown in the drawings, a second shoe may be added above or below crowder shoe 27 so that if one is forced away from the tube by any irregularity, the other shoe will always be in operative position.

The front face 40 of the crowder shoe is concave to fit around a portion of tube 2 and is positioned adjacent said tube. The edge of the crowder shoe adapted to engage the cord being wound on the spindle is cut away, as indicated at 41 (Figs. 4 and 5), to provide proper contact between the crowder shoe and the cord. The edge 41 engages the cord immediately after it has been wound on the spindle, and since the crowder shoe has not moved as far to the right, as seen in Fig. 1, as the diameter of the cord during the previous revolution of the tube, the cord is compressed laterally to make it fit in the space across which the shoe has moved in that time.

The tension on cord 3 prevents it from springing back after it has been crowded into position on the tube. The tendency of the cord to spring back may be further reduced by roughening the surface of the tube by pressing a piece of coarse emery paper lightly against the rotating tube before the cord is wound thereon.

The cord wound around the tube to form a diffuser tube may be either a grooved monofilament cord or a multistrand cord as described in my hereinabove mentioned copending application. In Fig. 4 a three strand cord is shown in magnified cross-section. The grooves in the monofilament cord or the grooves between the strands of the multi-strand cord form the pores for the diffusion and emission of the air from the interior of the tube. These grooves are helically arranged on the cord and the strand of one convolution of cord cannot mesh into the groove of either adjacent convolution. Therefore, when the cords are flattened at their line of contact by pressure applied by the crowder shoe at right angles to the wind, very regular pores are formed. The amount of pressure applied determines the size of the pores. This pressure is regulated by adjusting the lateral travel of the crowder shoe relative to the speed of rotation of the spindle, core or tube and the diameter of the cord.

Although I have described a preferred embodiment of my winding machine in considerable detail, it will be understood that the description is illustrative, rather than restrictive, as many details may be modified or changed without departing from the spirit or scope of my invention. Accordingly, I do not desire to be restricted to the exact structure described, except as limited by the appended claims.

I claim:

1. In a winding machine for winding a cord around a rotating spindle, a crowder shoe positioned adjacent said spindle, a rod projecting rearwardly from said crowder shoe, a bracket supporting the rear end of said rod, and a spring coiled around said rod between said bracket and said crowder shoe.

2. A winding machine for winding a cord around a rotating spindle, said machine comprising a crowder shoe positioned adjacent said spindle, a bracket positioned rearwardly of said crowder shoe, a rod projecting from said crowder shoe and supported at its rear end by said bracket, means on said rod urging said rod forward axially to hold said crowder shoe in contact with said spindle, and a friction wheel positioned rearwardly of said crowder shoe and adapted to tension the cord being wound on said spindle, said crowder shoe and said friction wheel being movable as a unit laterally relative to said spindle.

3. In a winding machine for winding a cord around a rotatable spindle, a base, a bracket rigidly mounted on said base, a spreader bar mounted adjacent said bracket, a crowder shoe having one edge engaging one end of said spreader bar, a post secured to said base and engaging the opposite edge of said crowder shoe to prevent lateral movement of said crowder shoe relative to said base, pins projecting laterally from said bracket into engagement with the top and bottom of said crowder shoe to hold it against vertical movement and a spring engaging the rear end of said crowder shoe to resiliently urge the forward edge of said crowder shoe into engagement with said rotatable spindle to properly position the cord being wound on said cylinder.

CARL H. NORDELL.

References Cited in the file of this patent

UNITED STATES PATENTS

| Number | Name | Date |
|---|---|---|
| 249,525 | Howard | Nov. 15, 1881 |
| 665,015 | Kennedy | Jan. 1, 1901 |
| 850,993 | Brown | Apr. 23, 1907 |
| 1,079,417 | Kreiter et al. | Nov. 25, 1913 |
| 1,799,918 | Marsden | Apr. 7, 1931 |
| 2,139,784 | Wengel | Dec. 13, 1938 |
| 2,165,411 | Peyton | July 11, 1939 |
| 2,426,631 | Mapes | Sept. 5, 1947 |

FOREIGN PATENTS

| Number | Country | Date |
|---|---|---|
| 103,690 | Great Britain | Feb. 5, 1917 |
| 835,176 | France | Sept. 19, 1938 |